US007200657B2

(12) United States Patent
Adams et al.

(10) Patent No.: US 7,200,657 B2
(45) Date of Patent: Apr. 3, 2007

(54) AUTONOMIC PROVISIONING OF NETWORK-ACCESSIBLE SERVICE BEHAVIORS WITHIN A FEDERATED GRID INFRASTRUCTURE

(75) Inventors: Samuel S. Adams, Apex, NC (US); Kyle G. Brown, Apex, NC (US); David B. Lindquist, Raleigh, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 10/261,267

(22) Filed: Oct. 1, 2002

(65) Prior Publication Data

US 2004/0064548 A1 Apr. 1, 2004

(51) Int. Cl.
*G06F 15/173* (2006.01)
(52) U.S. Cl. ............... 709/224; 709/226; 709/201; 718/105
(58) Field of Classification Search ............. 709/201, 709/224, 226; 718/105
See application file for complete search history.

(56) References Cited

U.S. PATENT DOCUMENTS

| | | | | |
|---|---|---|---|---|
| 4,920,487 A | * | 4/1990 | Baffes ....................... 718/105 |
| 5,539,883 A | * | 7/1996 | Allon et al. ............... 718/105 |
| 5,951,694 A | | 9/1999 | Choquier et al. |
| 6,112,243 A | * | 8/2000 | Downs et al. .............. 709/226 |
| 6,430,618 B1 | * | 8/2002 | Karger et al. .............. 709/225 |
| 6,519,553 B1 | * | 2/2003 | Barnette et al. ............... 703/2 |
| 6,553,420 B1 | * | 4/2003 | Karger et al. .............. 709/226 |
| 6,578,147 B1 | * | 6/2003 | Shanklin et al. ............ 726/22 |
| 6,714,980 B1 | * | 3/2004 | Markson et al. ........... 709/226 |
| 6,779,016 B1 | * | 8/2004 | Aziz et al. ................. 709/201 |
| 6,816,905 B1 | * | 11/2004 | Sheets et al. .............. 709/226 |
| 6,853,642 B1 | * | 2/2005 | Sitaraman et al. ....... 370/395.4 |
| 6,917,592 B1 | * | 7/2005 | Ramankutty et al. ....... 370/237 |
| 6,952,401 B1 | * | 10/2005 | Kadambi et al. ........... 370/232 |
| 6,963,915 B2 | * | 11/2005 | Karger et al. .............. 709/226 |
| 6,986,139 B1 | * | 1/2006 | Kubo ........................ 718/105 |

OTHER PUBLICATIONS

Tierney B L et al: "A network-aware distributed storage cache for data intensive environments" High Performance Distributed Computing, 1999. Proceedings. The Eight International Symposium on Redondo Beach, CA, USA Aug. 3-6, 1999, Los Alamitos, CA, USA IEEE Comput. Soc, US, Aug. 3, 1999, pp. 185-193.

(Continued)

*Primary Examiner*—Saleh Najjar
*Assistant Examiner*—Faruk Hamza
(74) *Attorney, Agent, or Firm*—Gerald R. Woods; Marcia L. Davlaet

(57) ABSTRACT

Methods, systems, computer program products, and a method of doing business are disclosed for autonomically provisioning network-accessible services in a decentralized network having a federated grid infrastructure. Autonomic, grid, and web services-related technologies, standards, and concepts are leveraged. More particularly, web service behaviors (augmented as grid services, according to preferred embodiments) are autonomically provisioned (i.e., dynamically distributed) via a grid of hosting services. In preferred embodiments, this dynamic distribution occurs in response to (and as a function of) external catalysts, such as algorithms that monitor designated resources (e.g., to proactively determine when the commitments in a utility service provider's service level agreements are in jeopardy).

13 Claims, 12 Drawing Sheets

OTHER PUBLICATIONS

Foster I et al.: "Grid services for distributed system integration" Computer, Jun. 2002, IEEE Comput. Soc, USA, 'Online! vol. 35. No. 6, pp. 37-46 XP002266915 ISSN: 0018-9162 Retrieved from Internet: ,URL: http://www.golbus.org/research/papers/ieee-cs.2.pdf. 'Retrieved on Jan. 14, 2004.

Vazhkudai S et al: "Replica selection I the globus data grid" Proceedings of the First IEEE/ACM International Conference on Cluster Computing and the Grid (CCGRID 2001), IEEE Computer Society Press, May 15, 2001, pp. 106-113.

Steven Tuecke et al., *Grid Service Specification*, Draft 3 (Jul. 17, 2002), Global Grid Forum, Sep. 13, 2002 <http://www.gridforum.org/ogsi-wg/drafts/GS_Spec_draft03_2002-07-17.pdf>.

*What is Grid computing?*, IBM Corporation, Sep. 13, 2002 <http://www-1.ibm.com/grid/grid_what_is.shtml>.

I. Foster et al., "Grid Services for Distributed System Integration", *Computer*, 35(6), 2002.

I. Foster et al., *The Physiology of the Grid: An Open Grid Services Architecture for Distributed Systems Integration*, Jun. 22, 2002, The Globus Project, Sep. 13, 2002 <http://www.globus.org/research/papers/ogsa.pdf>.

Steven Tuecke et al., *Grid Service Specification*, Feb. 15, 2002, Sep. 13, 2002 <http://umbriel.dcs.gla.ac.uk/Nesc/general/esi/events/gog2/gsspec.pdf>.

I. Foster et al., *The Anatomy of the Grid: Enabling Scalable Virtual Organizations*, The Globus Project, Sep. 13, 2002 <http://www.globus.org/research/papers/anatomy.pdf>.

\* cited by examiner

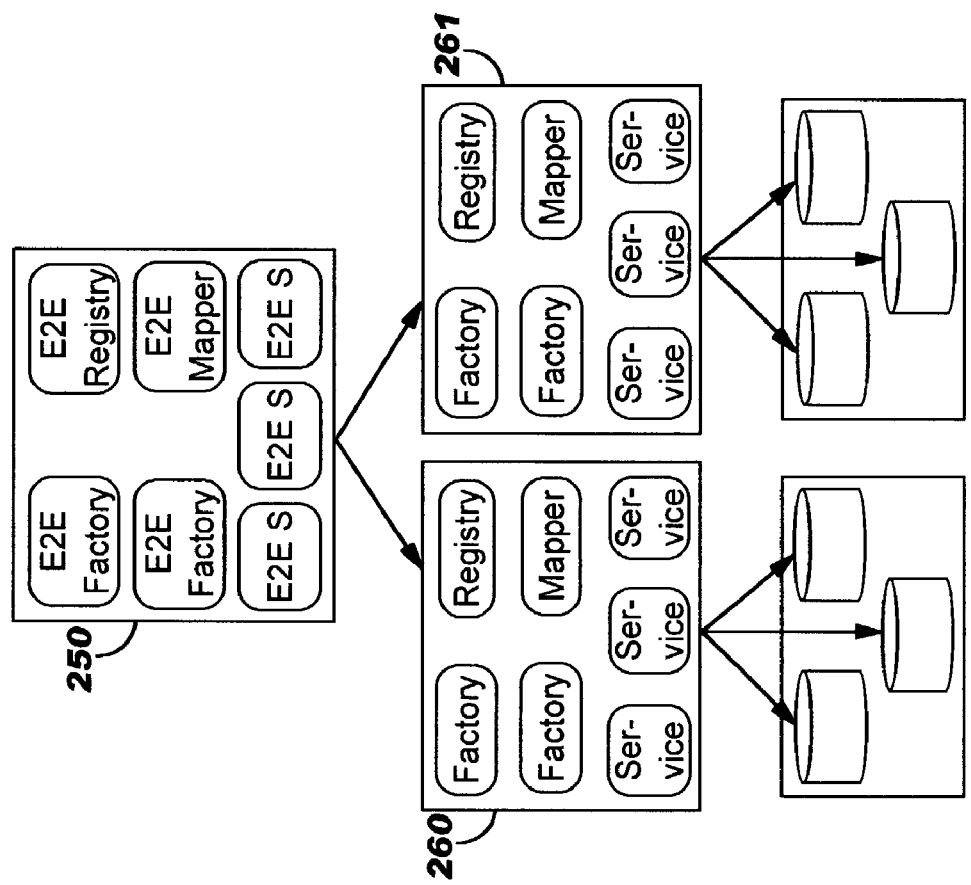

FIG. 3A

```
300  <?xml version="1.0" encoding="UTF-8"?>
     <wsdl:definitions
     targetNamespace="http://www.ibm.com/igs/grid/hosting-interface"
             xmlns:wsdl="http://schemas.xmlsoap.org/wsdl/"
306          xmlns:gsdl="http://schemas.gridforum.org/gridServices/"
             xmlns:impl="http://www.ibm.com/igs/grid/hosting-implementation"
305          xmlns:intf="http://www.ibm.com/igs/grid/hosting-interface"
             xmlns:soap="http://schemas.xmlsoap.org/wsdl/soap/"
             xmlns:soapenc="http://schemas.xmlsoap.org/soap/encoding/"
307          xmlns:xsd="http://www.w3.org/2001/XMLSchema">

311  <wsdl:message name="activateRequest">
         <wsdl:part name="portName" type="xsd:string"/>
         <wsdl:part name="implementationReference" type="xsd:anyURI"/>
     </wsdl:message>

312  <wsdl:message name="activateResponse">
         <wsdl:part name="result" type="xsd:boolean"/>
     </wsdl:message>

313  <wsdl:message name="deactivateRequest">
         <wsdl:part name="portName" type="xsd:string"/>
     </wsdl:message>

314  <wsdl:message name="deactivateResponse">
         <wsdl:part name="result" type="xsd:boolean"/>
     </wsdl:message>

315  <wsdl:message name="addPortDelegateRequest">
         <wsdl:part name="portName" type="xsd:string"/>
     </wsdl:message>

316  <wsdl:message name="addPortDelegateResponse">
         <wsdl:part name="result" type="xsd:boolean"/>
     </wsdl:message>

317  <wsdl:message name="deployRequest">
         <wsdl:part name="portName" type="xsd:string"/>
     </wsdl:message>
```

FIG. 3B

```
                    ┌─ <wsdl:message name="deployResponse">
              318  │      <wsdl:part name="result" type="xsd:boolean"/>
                    └─ </wsdl:message>

┌─ <wsdl:message name="setOptionsRequest">
310           319  │      <wsdl:part name="portName" type="xsd:string"
(cont'd)           │      <wsdl:part name="options" type="xsd:string"/>
                    └─ </wsdl:message>

┌─ <wsdl:message name="setOptionsResponse">
              320  │      <wsdl:part name="result" type="xsd:boolean"/>
                    └─ </wsdl:message>

┌─ <wsdl:portType name="RoutingPortType">
              │
              │   ┌─ <wsdl:operation name="activate">
              │ 326 │     <wsdl:input message="intf:activateRequest"/>
              │     │     <wsdl:output message="intf:activateResponse"/>
              │   └─ </wsdl:operation>
              │
325           │   ┌─ <wsdl:operation name="deactivate">
              │ 327 │     <wsdl:input message="intf:deactivateRequest"/>
              │     │     <wsdl:output message="intf:deactivateResponse"/>
              │   └─ </wsdl:operation>
              │
              │   ┌─ <wsdl:operation name="addPortDelegate">
              │ 328 │     <wsdl:input message="intf:addPortDelegateRequest"/>
              │     │     <wsdl:output message="intf:addPortDelegateResponse"/>
              │   └─ </wsdl:operation>
              └─ </wsdl:portType>

┌─ <wsdl:portType name="ProvisionPortType">
              │   ┌─ <wsdl:operation name="deploy">
330         331 │     <wsdl:input message="intf:deployRequest"/>
              │     │     <wsdl:output message="intf:deployResponse"/>
              │   └─ </wsdl:operation>
```

FIG. 3C

```
                  <wsdl:operation name="setOptions">
          332         <wsdl:input message="intf:setOptionsRequest"/>
                      <wsdl:output message="intf:setOptionsResponse"/>
 330              </wsdl:operation>
(cont'd)          </wsdl:portType>

335
                  <gsdl:serviceType name="HostingService">
          336        <gsdl:portTypeList>
          337           <gsdl:portTypeRef="intf:Routing"/>
          338           <gsdl:portTypeRef="intf:Provision"/>
                        <gsdl:portTypeRef="gsdl:GridService"/>
                        <gsdl:portTypeRef="gsdl:HandleMap"/>
          339           <gsdl:portTypeRef="gsdl:NotificationSource"/>
                        <gsdl:portTypeRef="gsdl:NotificationSink"/>
                        <gsdl:portTypeRef="gsdl:Factory"/>
                     </gsdl:portTypeList>
                  </gsdl:serviceType>

<gsdl:serviceData name="HostingServiceNotificationData"
                        goodFrom="2002-02-24T13:20:00-05:00"
                        goodUntil="2002-02-24T18:20:00-05:00"
                        notGoodAfter="2002-02-25T13:20:00-05:00">
          340        <gsdl:notificationSourceTopic
                             messageType="gsdl:compatibilityAssertion"/>
                     <gsdl:topicSubject
                             handle="urn:hosting.service.compatibilityAssertion"/>
                  </gsdl:serviceData>

<wsdl:binding name="RoutingSoapBinding"
                        type="intf:RoutingPortType">
          350        <soap:binding style="rpc"
                             transport="http://schemas.xmlsoap.org/soap/http"/>
```

FIG. 3D

```
<wsdl:operation name="activate">
        <soap:operation soapAction="" style="rpc"/>
        <wsdl:input>
                <soap:body encodingStyle=
                            "http://schemas.xmlsoap.org/soap/encoding/"
                        namespace=
                            "http://www.ibm.com/igs/grid/hosting-interface"
                        use="encoded"/>
        </wsdl:input>
        <wsdl:output>
                <soap:body
                        encodingStyle=
                            "http://schemas.xmlsoap.org/soap/encoding/"
                        namespace=
                            "http://www.ibm.com/igs/grid/hosting-interface"
                        use="encoded"/>
        </wsdl:output>
</wsdl:operation>

<wsdl:operation name="deactivate">
        <soap:operation soapAction="" style="rpc"/>
        <wsdl:input>
                <soap:body encodingStyle=
                            "http://schemas.xmlsoap.org/soap/encoding/"
                        namespace=
                            "http://www.ibm.com/igs/grid/hosting-interface"
                        use="encoded"/>
        </wsdl:input>
        <wsdl:output>
                <soap:body
                        encodingStyle=
                            "http://schemas.xmlsoap.org/soap/encoding/"
                        namespace=
                            "http://www.ibm.com/igs/grid/hosting-interface"
                        use="encoded"/>
        </wsdl:output>
</wsdl:operation>
```

```
<wsdl:operation name="addPortDelegate">
    <soap:operation soapAction="" style="rpc"/>
    <wsdl:input>
        <soap:body encodingStyle=
                "http://schemas.xmlsoap.org/soap/encoding/"
            namespace=
                "http://www.ibm.com/igs/grid/hosting-interface"
            use="encoded"/>
    </wsdl:input>
    <wsdl:output>
        <soap:body encodingStyle=
                "http://schemas.xmlsoap.org/soap/encoding/"
            namespace=
                "http://www.ibm.com/igs/grid/hosting-interface"
            use="encoded"/>
    </wsdl:output>
</wsdl:operation>
</wsdl:binding>
```
*350 (cont'd)*, *353*

```
<wsdl:binding name="ProvisionSoapBinding"
        type=" intf:ProvisionPortType">
    <soap:binding style="rpc"
            transport="http://schemas.xmlsoap.org/soap/http"/>

<wsdl:operation name="deploy">
        <soap:operation soapAction="" style="rpc"/>
        <wsdl:input>
            <soap:body encodingStyle=
                    "http://schemas.xmlsoap.org/soap/encoding/"
                namespace=
                    "http://www.ibm.com/igs/grid/hosting-interface"
                use="encoded"/>
        </wsdl:input>
        <wsdl:output>
            <soap:body encodingStyle=
                    "http://schemas.xmlsoap.org/soap/encoding/"
                namespace=
                    "http://www.ibm.com/igs/grid/hosting-interface"
                use="encoded"/>
        </wsdl:output>
    </wsdl:operation>
```
*360*, *361*

FIG. 3F

```
<wsdl:operation name="setOptions">
    <soap:operation soapAction="" style="rpc"/>
    <wsdl:input>
        <soap:body encodingStyle=
                "http://schemas.xmlsoap.org/soap/encoding/"
            namespace=
                "http://www.ibm.com/igs/grid/hosting-interface"
            use="encoded"/>
    </wsdl:input>
    <wsdl:output>
        <soap:body encodingStyle=
                "http://schemas.xmlsoap.org/soap/encoding/"
            namespace=
                "http://www.ibm.com/igs/grid/hosting-interface"
            use="encoded"/>
    </wsdl:output>
</wsdl:operation>
</wsdl:binding>
</wsdl:definitions>
```

```
400   <gsdl:compatibilityAssertion
            name="HostingService.004.PlatformCompatibilities">
         <gsdl:documentation>

This Compatibility Statement was made by Grid Hosting Service XYZ

</gsdl:documentation>

<gsdl:compatible
410            name="IUS:HostingServiceType"
420            WithName=
                  "JSR109:J2EE-WebService-ReferenceImplementation"
430            Type="serviceImplementation"/>

</gsdl:compatibilityAssertion>
```

FIG. 5

```
500   <gsdl:compatibilityAssertion
            name="HostingService.004.UtilityServiceCompatibilities">
         <gsdl:documentation>

This Compatibility Statement was made by Grid Hosting Service XYZ

</gsdl:documentation>

<gsdl:compatible
510            name="IUS:HostingServiceType"
520            WithName=
                  "FID:IdentityServicePortType"
530            Type="portType"/>

</gsdl:compatibilityAssertion>
```

FIG. 6

```
600   <gsdl:compatibilityAssertion
              name="HostingService.004.CapacityAvailabilityCompatibilities">
          <gsdl:documentation>

This Compatibility Statement was made by Grid Hosting Service XYZ

</gsdl:documentation>

<gsdl:compatible
610              name="IUS:HostingServiceType"
620              WithName=
                      "AvailableCapacity:50%"
630              Type="serviceImplementation"/>

</gsdl:compatibilityAssertion>
```

FIG. 7

```
700   <gsdl:compatibilityAssertion
              name="HostingService.004.PTA.CompatibilityAssertion">
          <gsdl:documentation>

This Compatibility Statement was made by Grid Hosting Service XYZ

</gsdl:documentation>
710       <xsd:annotation>
720           <xsd:appInfo>
730               <deployment location=
      "http://www.ibm.com/grid/deployment/fid/trustproxy.deploymentdescriptor.xml"/>
              </xsd:appInfo>
          </xsd:annotation>
          <gsdl:compatible
740              name="IUS:HostingServiceType"
750              WithName=
                      "FID:TrustProxyServiceImplementation"
760              Type="serviceImplementation"/>
      </gsdl:compatibilityAssertion>
```

AUTONOMIC PROVISIONING OF NETWORK-ACCESSIBLE SERVICE BEHAVIORS WITHIN A FEDERATED GRID INFRASTRUCTURE

BACKGROUND OF THE INVENTION

1. Field of the Invention

The present invention relates to computer networks, and deals more particularly with methods, systems, computer program products, and methods of doing business wherein network-accessible services are autonomically provisioned in a decentralized network having a federated grid infrastructure.

2. Description of the Related Art

Service level agreements, or "SLAs", are commonly used by network service providers to define their contractual service obligations to their customers. These service obligations typically include response time commitments, whereby the customer is guaranteed that requests for various types of network-accessible services will be completed within some average elapsed time and/or within some maximum elapsed time. Service obligations also typically include availability commitments for resources (including network-accessible services). If the service obligations are not met, the customer might be entitled to a reduction in the fees owed to the service provider. Service providers are therefore highly motivated to meet the commitments in their SLAs.

Due to the inability to accurately predict demand and processing load, service providers often provide excess capacity when statically provisioning resources for their customers. Resources provided for some customers may occasionally experience a "web storm", that is, a dramatic temporary surge in demand. (For example, a particular network-accessible service may become flooded with incoming requests, or a particular server might experience a heavy request volume for the applications it hosts, and so forth.) This increased demand may be an increase of several orders of magnitude over the typical demand. Even though service providers may provide excess capacity when provisioning resources, it is not cost-effective for the service providers to provide an instance-based topology that is capable of servicing the level of traffic that may be experienced during a web storm.

To a lesser degree, profitability is also negatively impacted when the service provider provision excess capacity that can meet the customer's more "normal" spikes in demand.

An emerging trend in information technology in general, and in decentralized networks of the type provided by network service providers, is use of collaboration. This trend is evidenced by the level of investment in so-called "web services" and in the adoption of a number of open industry standards supporting web services. In general, the term "web service" refers to an interface that describes a collection of network-accessible operations. Web services technology is a mechanism for distributed application integration, and is also commonly referred to as the "service-oriented architecture" for distributed computing. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e., order placement software) at the ordering business and an order fulfillment service at one or more of its business partners. In turn, this order fulfillment service may interact with a credit card approval service, a package delivery service, and so forth.

The open industry standards leveraged by Web services to facilitate "just-in-time" distributed application integration include HTTP ("Hypertext Transfer Protocol"), SOAP ("Simple Object Access Protocol") and/or XML ("Extensible Markup Language") Protocol, WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet SOAP is an XML-based protocol used to invoke methods in a distributed environment. XML Protocol is an evolving specification of the World Wide Web Consortium ("W3C") for an application-layer transfer protocol that will enable application-to-application messaging. XML Protocol may converge with SOAP. WSDL is an XML format for describing distributed network services. UDDI is an XML-based registry technique with which businesses may list their services and with which service requesters may find businesses providing particular services. Just-in-time application integration will be possible by issuing UDDI requests to locate distributed services through a UDDI registry, and dynamically binding the requester to a located service using service information which is conveyed in a platform-neutral WSDL tbrmat using SOAP/XML Protocol and HTTP messages. (Hereinafter, references to SOAP should be construed as referring equivalently to semantically similar aspects of XML Protocol.) Using these components, web services will provide requesters with transparent access to program components which may reside in one or more remote locations, even though those components might run on different operating systems and be written in different programming languages than those of the requester. (For more information on SOAP, refer to "Simple Object Access Protocol (SOAP) 1.1, W3C Note 08 May 2000", which may be found using the W3C Web page. More information on XML Protocol may also be found using this Web page. More information on WSDL may be found in "Web Services Description Language (WSDL) 1.1, W3C Note 15 March 2001", also axailable from the W3C Web page. For more information on UDDI, refer to the UDDI specification found at the UDDI Web page. HTTP is described in Request For Comments ("RFC") 2616 from the Internet Engineering Task Force, titled "Hypertext Transfer Protocol—HTTP/1.1" (June 1999).)

With increased use of collaborative networking, efficient techniques for resource sharing will become critical. Resource sharing is complicated in conventional distributed or decentralized networks by the heterogeneity that exists when using technologies such as web services. In recent years, the academic and scientific communities cooperated to develop the concept of "grid technology" for sharing their resources. As defined by IBM in "What is Grid computing?", grid is "a collection of distributed computing resources available over a local or wide area network that appear to an end user or application as one large virtual computing system. The vision [of grid computing] is to create virtual dynamic organizations through secure, coordinated resource-sharing among individuals, institutions and resources. Grid computing is an approach to distributed computing that spans not only locations but also organizations, machine architectures and software boundaries to provide unlimited power, collaboration and information access to everyone connected to a Grid."

Grid technology allows enterprises to share resources as they form "virtual organizations"—that is, the enterprises share their resources and services (which may be in geographically-widespread locations and which may have heterogeneous computing platforms) to form virtual computing services. (See "Grid Services for Distributed System Integration", I. Foster et al., *Computer,* 35(6), 2002, for more information about grid technology.

Today, an architecture referred to as "Open Grid Services" is being developed by academic and scientific communities, along with commercial entities such as International Business Machines Corporation ("IBM®"), as an evolution of grid technology. This Open Grid Services architecture ("OGSA") enables a grid to provide enterprises with an extensible set of services that can be aggregated by the virtual organizations (see Id.). According to OGSA, all computational resources, storage resources, networks, programs, databases, and so forth are modelled as services, providing a service-oriented view. OGSA leverages web services technology (and the open industry standards on which that technology is built) as well as grid technology. (Refer to OGSA information available from the Globus Alliance Web Page and to "The Physiology of the Grid: An Open Grid Services Architecture for Distributed Systems Integration", I. Foster et al, for more information on the OGSA. A document titled "Grid Service Specification (Draft 3, Jul. 17, 2002)", hereinafter "the Grid Service Specification" or "GSS", provides a definition of standard interfaces and behaviors of a grid service that is built on a web services base.

The OGSA work effort includes an evolution of a programmer's toolkit referred to as the "Globus Toolkit", which is designed to make creation of grid-based applications easier. The Globus Toolkit defines a "grid runtime" as a set of services. This set of services includes: (1) a Grid Resource Allocation and Management ("GRAM") protocol and "gatekeeper" service, designed to provide secure, reliable service creation and management; (2) a Monitoring and Discovery Service ("MDS-2") for information discovery; and (3) a Grid Security Infrastructure for single sign-on, delegation, and credential mapping.

Another emerging technology is autonomic computing, which reduces the maintenance and administrative complexity inherent in information technology ("IT") systems and networks by employing algorithms that allow the systems and networks to monitor and manage themselves. An autonomic system is defined as one which displays one or more of the following characteristics: (1) self-defining; (2) self-configuring; (3) self-optimizing; (4) self-healing; (5) self-protecting; (6) anticipatory; and (7) contextually aware in a heterogeneous environment. (These concepts are known in the art; accordingly, a detailed description thereof is not deemed necessary to an understanding of the present invention.)

What is needed are techniques for leveraging resources more efficiently within a network domain that facilitates collaborative interconnected networks (of the type that are supported by the concepts of OGSA and grid technology) while avoiding the expensive and inefficient over-commitment of resources.

SUMMARY OF THE INVENTION

An object of the present invention is to provide techniques for leveraging resources more efficiently within collaborative interconnected networks.

Another object of the present invention is to provide these techniques while avoiding the expensive and inefficient over-commitment of resources.

Yet another object of the present invention is to provide techniques for provisioning web service autonomically within a federated grid infrastructure.

Still another object of the present invention is to provide techniques for dynamically sharing resources among distinct enterprises.

A further object of the present invention is to define techniques for migrating hosted services dynamically, responsive to one or more factor(s) such as demand and/or available capacity.

Another object of the present invention is to define techniques for autonomically offloading hosted services from an inundated hosting system.

Still another object of the present invention is to define techniques for ensuring that SLA commitments are met by utility service providers.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for autonomically provisioning network-accessible services in a decentralized network having a federated grid infrastructure. In one embodiment, the present invention comprises: deploying a network-accessible service behavior as a grid service at a grid hosting service in the grid infrastructure (or, alternatively, at more than one grid hosting service); monitoring one or more thresholds applicable to the grid hosting service (or, applicable to a selected one of the more than one grid hosting services); and dynamically offloading demand for the grid service to one or more selected other grid hosting services in the grid infrastructure when at least one of the monitored thresholds is exceeded.

In one aspect, the dynamic offloading preferably further comprises: dynamically determining, from a plurality of other grid hosting services, candidates for becoming the selected other grid hosting services; and suggesting to the candidates that they should self-provision the grid service. This may further comprise: receiving notification from individual ones of the candidates that this candidate has performed the self-provisioning; and routing an inbound request for the grid service to one of the individual ones.

In another aspect, the dynamic offloading further comprises: dynamically selecting the selected other grid hosting services from a plurality of other grid hosting services; and suggesting to the selected other grid hosting services that they should self-provision the grid service.

The one or more thresholds are preferably configurable, and at least one of the thresholds may pertain to available capacity of the grid hosting service.

The dynamic offloading is performed to selected ones of grid hosting services which are capable of hosting the grid service, where this capability may depend on whether the grid hosting service provides a particular platform and/or whether it has sufficient available processing capacity.

The techniques of the present invention may also be used advantageously in methods of doing business. For example, a utility service provider may implement steps such as: defining a particular network-accessible service as a grid service; deploying the grid service at one or more grid hosting services in the grid infrastructure; monitoring one or more thresholds applicable to a selected one of the one or more grid hosting services; and dynamically offloading demand for the grid service to one or more selected other grid hosting services when a result of operation of the monitoring step so indicates. This utility service provider may then service its customers using this implementation, and may charge those customers according to various revenue models, including monthly subscriptions (or other periodic subscriptions), pay-per-use, etc.

The present invention will now be described with reference to the following drawings, in which like reference numbers denote the same element throughout.

BRIEF DESCRIPTION OF THE DRAWINGS

FIGS. 2A–2C illustrate how virtual organizations are structured using a grid service infrastructure according to the prior art;

FIG. 3 (comprising FIGS. 3A–3F) provides a sample WSDL document illustrating how grid hosting services provided by preferred embodiments of the present invention may be defined within a distributed networking environment;

FIGS. 4–7 provide sample compatibility assertions that may be used by preferred embodiments of the present invention to communicate information among grid hosting services.

DESCRIPTION OF PREFERRED EMBODIMENTS

The present invention defines techniques for leveraging autonomic, grid, and web services-related technologies, standards, and concepts to autonomically provision web service behaviors within a federated grid infrastructure. In particular, web service behaviors (that is, the code implementing the web service, along with the interface to the web service) are autonomically provisioned (i.e., dynamically distributed) via a grid of hosting services. In preferred embodiments, this dynamic distribution occurs in response to (and as a function of) external catalysts, such as algorithms that monitor designated resources (e.g., to proactively determine when a utility service provider's SLA commitments are in jeopardy).

A grid hosting service, as the term is used herein, is a service that manages the deployment and provisioning of various third-party utility services. (The term "utility service" refers to a provider that offers its customers on-demand, pay-per-use access to resources such as data, storage, applications, network-accessible services, and/or networks.)

Before discussing the techniques of preferred embodiments in more detail, a brief description of grid services (according to the prior art) and how virtual organizations may be structured using a grid service infrastructure will be provided, referring to FIGS. 1 and 2A–2C. (The examples in these figures are based on similar examples that appear in "Grid Services for Distributed System Integration", I. Foster et al., published by IEEE in *Computer*, Vol. 35, No. 6, June 2002, pp. 37–46. Similar information is provided in "The Physiology of the Grid: An Open Grid Services Architecture for Distributed Systems Integration", which was discussed earlier herein.)

Figure 1:
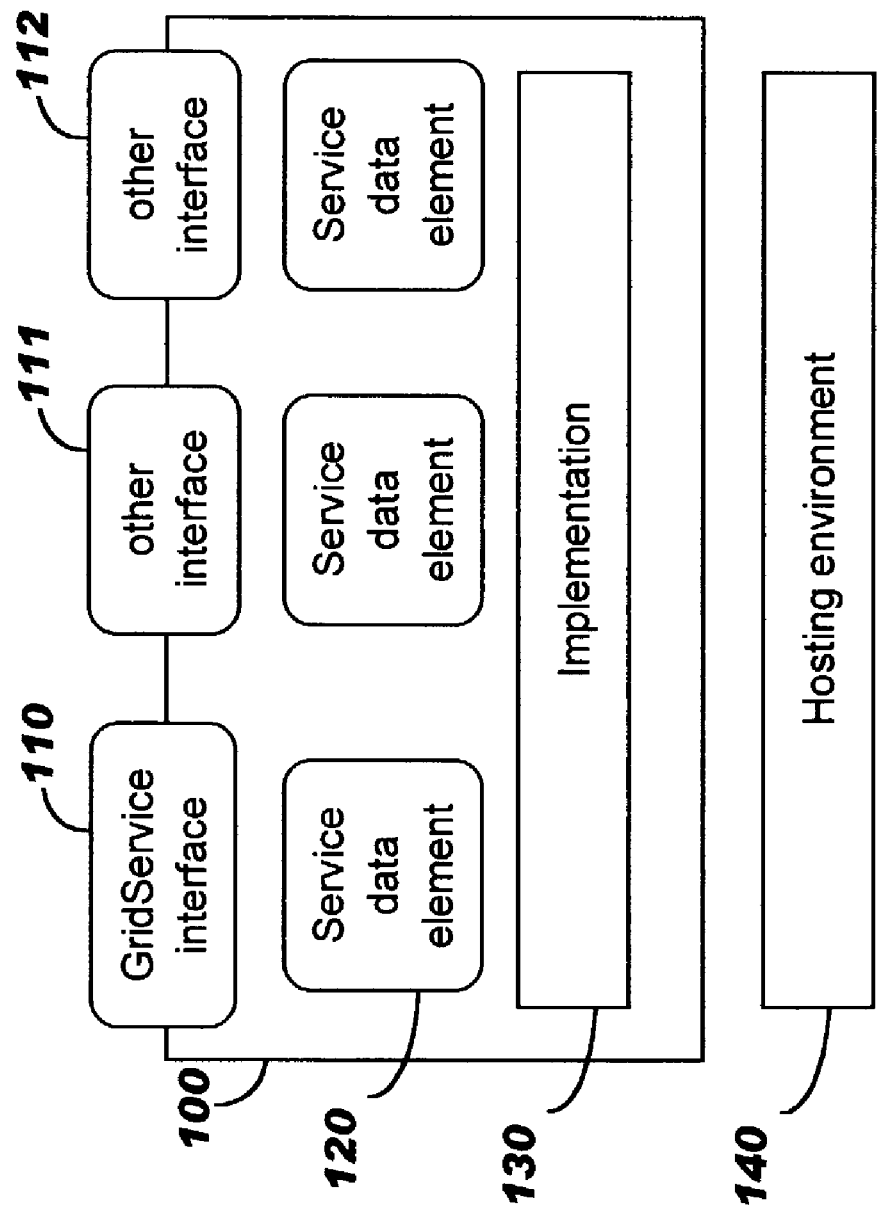
FIG. 1 illustrates a grid service, according to the OGSA of the prior art.

FIG. 1 depicts a grid service 100, according to the OGSA of the prior art. A particular grid service may be offered by one or more hosting services, and each of these hosting services may provide one or more grid services. When using techniques of the present invention, these hosting services are grid hosting services (i.e., they support the interfaces defined herein for grid hosting services.) A grid service may be autonomically provisioned at one or more additional grid hosting services, according to the techniques disclosed herein.

"Grid service" refers to a web service that is augmented with an additional interface, in order to be compliant with OGSA, and that follows certain conventions. According to the Grid Service Specification, a grid service is "a WSDL-defined service that conforms to a set of conventions relating to its interface definitions and behaviors". (See Section 4, "The Grid Service", in the GSS.) According to OGSA, each grid service must implement the GridService interface 110, as shown in FIG. 1. This GridService interface includes functions for querying the GridService instance, setting its lifetime, and explicitly destroying the instance. Additional interfaces specified in OGSA are optional, as shown at 111, 112. These optional interfaces may comprise one or more service-specific interfaces, and/or one or more of the OGSA interfaces. The OGSA interfaces (some of which remain to be defined) include a Factory interface for dynamic creation of grid service instances; notification functions that enable service instances to communicate with one another asynchronously; a Registry interface for registering instance handles; a Mapping interface for locating a grid service instance by its handle; an authorization interface; a policy management interface; and a manageability interface providing functions for monitoring and managing grid service instances.

A WSDL portType is preferably used to specify the service interfaces of each grid service, and the collection of portTypes that each grid service supports is preferably specified using a serviceType element. (The serviceType element is an extension to WSDL that is defined for use with grid services.) Refer to the discussion of FIG. 3, below, for more information about how the portType and serviceType elements are used to provide a grid service with autonomic provisioning capability according to preferred embodiments of the present invention.

One or more service data elements 120 are provided for each grid service. A service data element is a named, typed XML element encapsulated in a container. The service data elements for a particular grid service instance each provide service data for that instance, and have a unique name, a type, and a time-to-live (to be used for lifetime management). The information in the service data element allows requesters to find information about the grid service instance, including dynamically-created information (using introspective techniques, for example), and also allows the instance to be managed. (The "FindServiceData" operation of the GridService interface is preferably used to query a service data element.)

Each grid service may be provided by one or more implementations 130. Some implementations may be local to the environment in which the requester is operating, while others may be remotely located. The WSDL specification for the grid service allows requesters to access an implementation transparently (e.g., without regard to the programming language in which the service is implemented or the location of the service instance). A grid service can be hosted by one or more hosting environments 140 (which may alternatively be referred to as "execution environments"). The hosting environment determines the programming model, programming language, development and debugging tools that are available, and so forth. For example, an implementation of a grid service might be written as a procedure-oriented program using the "C" programming language and execute on a particular operating system platform, and another implementation of this same grid service might be written as an object-oriented program in the Java™ programming language and execute on the WebSphere® platform from IBM. These concepts are known in the art, and will not be described in detail herein. ("Java" is a trademark of Sun Microsystems, Inc., and "WebSphere" is a registered trademark of IBM.)

Figure 2B:
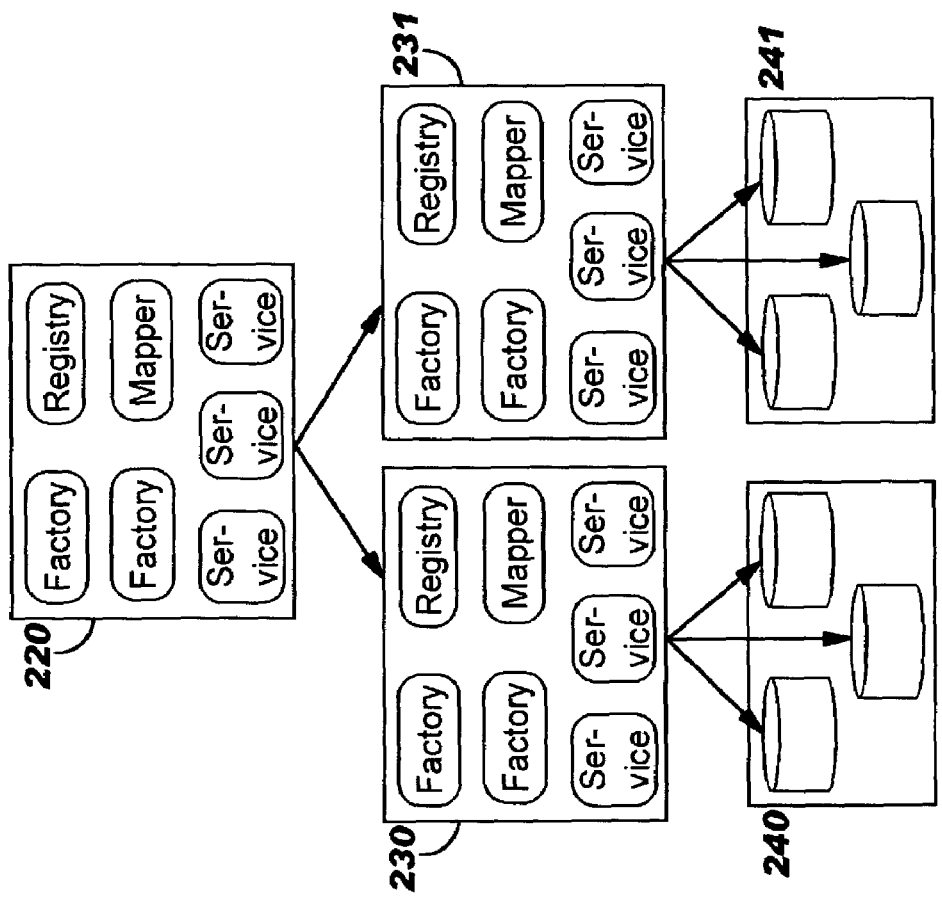
Figure 2A:
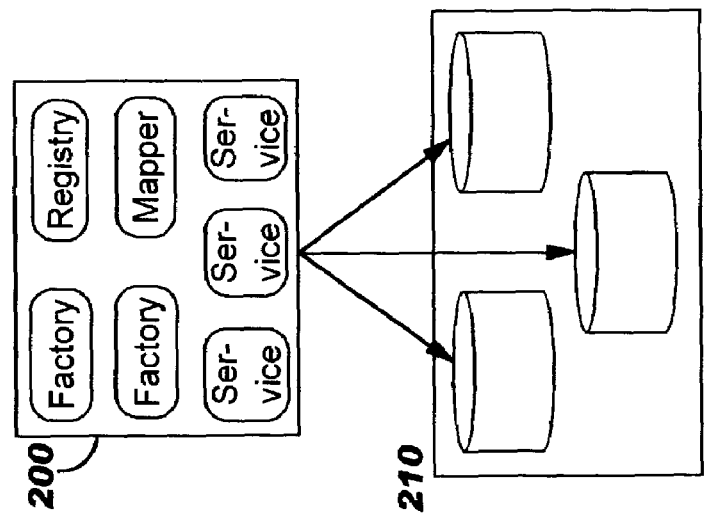

FIG. 2A illustrates how a simple hosting environment is structured, where the resources 210 of a grid service 200 are located within the grid service's local network domain. (The resources in FIGS. 2A–2C are shown as storage resources, although this is by way of example only.) This simple hosting environment comprises one or more factory instances (which may be used to create new grid services, as stated above), a registry of the available factories, and a mapper (used to locate a particular grid service instance given its globally-unique handle or identifier).

FIG. 2B shows a virtual hosting environment structure, where (for this example) two sets of resources 240, 241 are located within distinct network domains. The virtual organization ("VO") still provides an interface 220 as in FIG. 2A, comprising one or more factory instances, a registry of the available factories, and a mapper. Behind this VO interface 220 may be a collection of simple hosting environment interfaces of the type shown in FIG. 2A. In this example, two simple hosting environment interfaces 230, 231 provide accessibility to their resources 240, 241.

As with web services, the behaviors of one or more grid services may be aggregated to compose another grid service. This is illustrated by the interface to "end-to-end" grid service 250 in FIG. 2C, where the factory interface is now designated as an "end-to-end" ("E2E") factory, the services are "end-to-end" services ("E2E S"), and so forth. The E2E factory instances in this case create new instances of the end-to-end or aggregated grid service, and the E2E registry instance tracks and advertises those E2E factory instances. The E2E factory instances preferably interact with lower-level factory instances (for example, from grid service 260 and/or 261), asking those lower-level factories to create service instances that can then be aggregated to create the end-to-end grid service 250. (An end-to-end grid service may alternatively be referred to as a "collective" or "virtual" grid service.)

As demonstrated by FIGS. 2A–2C, a client can access a grid service and its resources in an identical manner, where the grid service interface is identical regardless of which hosting environment has been used to provide that grid service and those resources.

Turning now to the present invention, a hosting service is defined herein which manages the deployment and provisioning of various third-party utility services. The hosting service according to preferred embodiments of the present invention is a grid service, and is referred to herein as a "grid hosting service". A WSDL document (including extensions defined for OGSA) is preferably used to specify the grid hosting service, where a serviceType element specifies the portTypes of this service, and the operations and messages are specified for each portType element.

See FIG. 3C, where the serviceType element 335 specifies a list of portType elements using a portTypeList element 336. (The serviceType extensibility element is defined to enable aggregation of services.) This portTypeList element 336 is defined in the "gsdl" namespace, which is specified at 306 in FIG. 3A. The portTypeList element includes a number of references to portType definitions, using the gsdl portTypeRef element. The portTypes in this list include a Routing portType 337 and a Provision portType 338, according to the present invention, as well as a number of prior art portTypes 339 that are defined according to OGSA. These portTypes will be described in more detail below.

In preferred embodiments, this grid hosting service adheres to the concepts in OGSA and GSS. Accordingly, the semantics of the grid hosting service are defined by interface definitions (as illustrated by FIG. 1) and the implementation of the interface, and grid service descriptions provide away for would-be clients to discover both the interface and the implementation semantics. The interface semantics are specified in WSDL and are analogous to web service interface descriptions. while the implementation semantics art discovered by WSDL compatibility assertion elements. (The compatibility Assertion element is an extension of WSDL for use with grid services, and is described in some detail in Draft 1 of the Grid Service Specification, dated Feb. 15, 2002. It should be noted that descriptions of compatibility assertions herein use the syntax specified in the Draft 1 specification, and that the detailed syntax has been removed in the Draft 3 specification, which simply refers to the need for compatibility-assertion-type function for purposes such as change management without prescribing a particular syntax. Similarly, it way happen that changes are made to other portions of the syntax as the GSS definition evolves. It will be obvious to one of ordinary skill in the art how the syntax used in the examples herein can be revised or adapted to align with such changes.)

The grid hosting service may provide a variety of functions. In preferred embodiments, one or more of the following functions are included: (1) change management; (2) behavior conveyance; (3) behavior acquisition; and (4) compatibility assertion proclamation. Each of these functions will now be described.

Change management: The grid hosting service of preferred embodiments provides change management features which are analogous to those defined by GSS. When a grid service is changed, its portType and/or serviceType should be renamed if the change affects the service's semantics and/or interface (that is, a new name is provided to distinguish instances of this new service from previous instances which will have different semantics and/or interfaces). WSDL compatibility assertions are defined by GSS for advertising a grid service's implementation semantics. When the semantics of the implementation change, the new semantics are advertised by compatibility assertion mutations, as defined by GSS. For more information on how GSS provides change management, refer to Section 4.6, "Interface Naming and Change Management", in the GSS.

Behavior conveyance: According to the present invention, over-exercised grid hosting services will discharge (i.e., offload) one or more hosted service implementations to peer grid hosting services that have available processing capacity.

Behavior acquisition: According to the present invention, under-exercised grid hosting services will acquire third-party utility services which are realizing increasing demand.

Compatibility assertion proclamation: In accordance with the compatibility assertions defined by GSS, a grid hosting service according to preferred embodiments will advertise a set of compatibility assertions to peer grid hosting services.

A grid hosting service as defined herein hosts one or more grid service implementations (i.e., web services implementations which have been augmented to comply with OGSA) which may be dynamically distributed across the grid so as to reallocate resources (including computing capacity) as a function of ever-changing demand. According to preferred embodiments, each grid hosting service is capable of providing routing for its hosted grid services using the Routing portType of the grid hosting service, and is also capable of providing load balancing once a resource reaches a configurable loading factor or capacity threshold (referred to hereinafter as a capacity threshold for ease of reference). The capacity threshold acts as a trigger for the grid hosting service (or for a plurality of grid hosting services) to distribute a hosted service to peer grid hosting services within the grid. (It is not strictly necessary that the thresholds used by an implementation of the present invention are configurable. However, configurable thresholds are preferred over fixed thresholds because, for example, of their ability to more precisely tune the performance of diverse systems. Furthermore, use of the term "peer" should not be construed as meaning that the grid hosting services are providing identical functions: as used herein, the term "peer grid hosting service" simply means another grid hosting service.)

The grid service Notification interface of the prior art (with its NotificationSource and NotificationSink portTypes) provide a means for grid hosting services to collaborate, exchanging messages with one another asynchronously using a publish/subscribe mechanism. This Notification interface is leveraged by preferred embodiments to enable the grid hosting services to communicate about their capabilities and capacities. Compatibility assertions are published by grid hosting services as a way of advertising their capabilities. In particular, the assertions preferably identify the grid service(s) being hosted, as well as the run-time infrastructure provided by the grid hosting service. As defined herein, compatibility assertions are also used by the grid hosting services to publish metrics pertaining to their capacity (and these metrics may then be used in provisioning decisions).

Referring now to FIG. 3, the sample WSDL document 300 will be described in more detail, showing how a grid hosting service may be specified. For this example, the grid hosting service is named "HostingService" (see element 335). A number of namespace definitions may be provided, as shown at 305. Messages supported by the grid hosting service are specified, as shown at 310. A grid hosting service according to preferred embodiments supports an "activateRequest" message 311, an "activateResponse" message 312, a "deactivateRequest" message 313, a "deactivateResponse" message 314, an "addPortDelegateRequest" message 315, an "addPortDelegateResponse" message 316, a "deployRequest" message 317, a "deployResponse" message 318, a "setOptionsRequest" message 319, and a "setOptionsResponse" message 320.

The activateRequest message 311 includes a portName parameter and an implementationReference parameter, which are used to pass the name and Uniform Resource Identifier ("URI") of the grid service to be activated and a location where its implementation can be obtained, respectively. (A receiver of this message may use techniques such as introspection to determine whether it is capable of hosting the identified grid service.) The activateResponse message 312 includes a result parameter which indicates whether the activateRequest message was successful.

The deactivateRequest message 313 includes a portName parameter to identify the grid service to be deactivated. According to preferred embodiments, the deactivateRequest message is sent to the inundated grid hosting service when a peer hosting service has been requested to take over a hosted service and is now ready to take over for the inundated grid hosting service. The deactivateResponse message 314 includes a result parameter which indicates whether the deactivateRequest message was successful.

The addPortDelegateRequest message 315 includes a portName parameter for identifying the grid service to be discharged. In preferred embodiments, this message 315 is sent by a peer that has agreed to acquire the grid service, and allows the inundated grid hosting service to pass requests it receives for the discharged service on to the acquiring peer. The deployRequest message 317 is sent from an inundated grid hosting service to one or more candidates for taking over the grid service identified by the portName parameter. An implementation of the present invention may optionally include one or more parameters on this request message (not shown in FIG. 3) for conveying various types of metadata from the inundated grid hosting service. For example, the inundated grid hosting service might pass information to give the candidates an idea of the resource consumption or processing burden they might expect if they agree to take on the service identified by the portName parameter. The setOptionsRequest message 319 is used in preferred embodiments as a way of propagating information (such as configuration parameters, etc.) that may be needed for provisioning a grid service that is being offloaded from an inundated grid hosting service. (The information to be propagated for a particular grid service is preferably obtained from its deployment descriptor.) Accordingly, the message 319 is shown as having a portName parameter to identify the grid service and an options parameter with which the additional information can be propagated. The addPortDelegateResponse message 316, deployResponse message 318, and setOptionsResponse message 320 each include a result parameter which indicates whether the corresponding request message was successful.

Optionally, a candidate grid hosting serviced may agree to take on only some part of the inundated grid hosting service's workload for a particular grid service. In this case, an additional parameter is preferably added to the deployResponse message 318 (not shown in FIG. 3) to convey that information from the candidate. (Rather than modifying the request message 317 and response message 318 to include extra parameters, an implementation of the present invention may opt to leave these messages as shown in FIG. 3 and to add new messages that include the extra parameters. It will be obvious to one of ordinary skill in the art how the syntax example in FIG. 3 can be adapted for these variations.)

The portType definitions for this grid hosting service are specified next, and according to preferred embodiments, include a RoutingPortType 325 and a ProvisionPortType 330. The Routing portType 325 enables service requests to be routed by a grid hosting service to a newly-deployed grid service. The activateRequest and activateResponse messages are used by an "activate" operation 326 on the Routing portType, and the deactivateRequest and deactivateResponse messages are used by a "deactivate" operation 327 on this portType. The addPortDelegateRequest and addPortDelegateResponse messages are used by an "addPortDelegate" operation 328.

The Provision portType is used to dynamically deploy a grid service at a grid hosting service. The deployRequest and deployResponse messages are used by a "deploy" operation 331 on the Provision portType 330. The setOptionsRequest and setOptionsResponse messages are used by a "setOptions" operation 332 on the Provision portType 330.

The serviceType element 335 for the grid service named "HostingService" is then specified. This element includes a number of portTypeRef elements, as has been described above.

Following the serviceType element 335, a serviceData element 340 (defined in GSS as a WSDL extension) is specified. A serviceData element is used to specify attributes of a service data element for a grid service instance. (Refer to the discussion of element 120 of FIG. 1, above.) In this example, the serviceData element 340 specifies "HostingServiceNotificationData" as the local name for the topic of a service data element pertaining to the Notification interface.

The "goodFrom" and "goodUntil" attributes of serviceData element 340 specify when the values in the named service data element are valid, and the "notGoodAfter" attribute (which has been renamed "goodUntil" in Draft 3 of the GSS) specifies when the named service data element is expected to be last available.

The serviceData element 340 also includes a "notificationSourceTopic" element and a "topicSubject" element. The notificationSourceTopic element has a "messageType" attribute, and in this example, the message type is identified as a "compatibilityAssertion" message which is defined in the gsdl namespace. In general, this attribute is used to specify the XML schema type that describes all messages that will be sent as a result of subscribing to this topic. The topicSubject element has a "handle" attribute that is used to specify the globally-unique handle (identified as a Uniform Resource Name, or "urn") of the grid service instance to which messages of this topic may pertain. Thus, element 340 specifies that the service data element named "HostingServiceNotificationData" will be used as a vehicle for transmitting the compatibility assertions from a particular grid service instance.

WSDL binding information is then specified for the Routing portType (see reference number 350) and for the Provision portType (see reference number 360). According to preferred embodiments, SOAP bindings are used. This example specifies use of HTTP as a transport mechanism, and use of remote procedure call ("RPC") style invocation for each of the 5 operations provided by the Routing and Provision port types. (These 5 operations were previously specified at reference numbers 326, 327, 328, 331, and 332, and are described above. Their corresponding binding information is specified at 351, 352, 353, 361, and 362, respectively.)

As stated earlier, the grid hosting services according to preferred embodiments leverage the publish/subscribe mechanism (as defined for instances of the gridService interface) to inform each other of compatibility assertions and also use this publish/subscribe mechanism to exchange capacity metrics.

A compatibilityAssertion is used to declare that two elements are type compatible. According to the GSS, compatibilityAssertion elements can be specified for portTypes, serviceTypes, and serviceImplementations. Each compatibilityAssertion has a "name" attribute, an optional "documentation" element, and a "compatible" element. Each compatible element has a "name" attribute, a "withName" attribute, and a "type" attribute.

FIGS. 4 and 5 provide sample compatibilityAssertion specifications that may be used to convey information about the platform and utility services currently provided by a grid hosting service defined according to preferred embodiments, as will now be described. (The examples depicted in FIGS. 4–7 use document fragments specified using WSDL and its gsdl extensions to show the pertinent information to be advertised.)

A platform compatibility assertion indicates the run-time and deployment platform provided by a grid hosting service. The platform compatibility assertion 400 in FIG. 4 is an example, and states that the service implementation named "IUS:HostingServiceType" (see reference number 410) is compatible with a type named "JSR109:J2EE-WebServiceReferenceImplementation" (see reference number 420). In other words, the IUS:HostingServiceType complies with a particular reference implementation for the Java 2 Platform, Enterprise Edition ("J2EE™"), indicating that the grid hosting service is capable of hosting J2EE-compliant web (or grid) services. ("J2EE" is a trademark of Sun Microsystems, Inc.) This platform compatibility assertion further specifies that this is a service implementation compatibility assertion (see reference number 430).

A utility service compatibility assertion indicates that the grid hosting service issuing the compatibility assertion is currently hosting the specified utility service. The utility service compatibility assertion 500 in FIG. 5 is an example, and states that the port type named "IUS:HostingServiceType"(see reference number 510) is hosting a federated identity service implementation—that is, a service named "FID:IdentityServicePortType" (see reference number 520). This utility service compatibility assertion further specifies that this is a portType compatibility assertion (see reference number 530).

FIG. 6 provides a sample capacity availability assertion, which a grid hosting service defined according to preferred embodiments may use to advertise its capacity metrics, as will now be described.

Preferred embodiments use serviceImplementation compatibility assertions for advertising capacity metrics, as shown at reference number 630 of the assertion 600 in FIG. 6. In the general case, a grid hosting service may advertise its capacity information in a number of ways, including use of percentages or relative values. In this example assertion 600, the service implementation named "IUS:HostingServiceType"(see reference number 610) indicates that it is currently operating at 50 percent of its capacity (see reference number 620).

Preferred embodiments of the present invention use a port type assimilation ("PTA") variant of a compatibility assertion to suggest that an identified target grid hosting service should assimilate behavior from the advertising grid hosting service. In other words, when a grid hosting service issues a PTA compatibility assertion, the target grid hosting service is being requested to autonomically provision the specified grid service. (Note that this approach of "suggesting" an action to a peer grid hosting service, as opposed to directing the peer to provision a service, aligns with the collaborative model on which grid services are based.) The example compatibility assertion 700 in FIG. 7 states that the service implementation (see reference number 760) named "IUS:HostingServiceType" (see reference number 740) is compatible with the federated trust proxy service named "FID:TrustProxyServiceImplementation" (see reference number 750), and the grid hosting service to which this PTA compatibility assertion 700 is distributed (using the publish/subscribe notification mechanism) is requested to deploy this trust proxy service implementation from the deployment location specified by the "deployment" element 730. (The deployment element 730 is a child of the "appInfo" element 720 which in turn is a child of the "annotation" element 710. The annotation and appinfo elements are used to provide application information, and are specified in the "xsd" namespace identified at reference number 307.)

Figure 8:
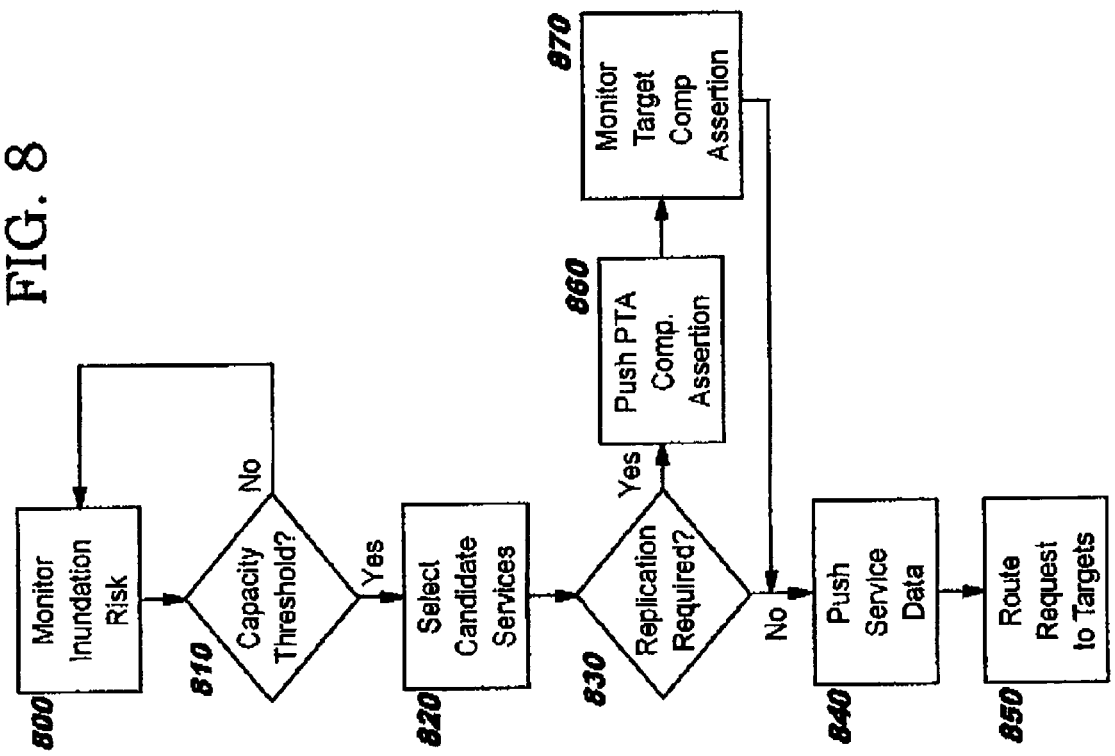
FIG. 8 provides a flowchart depicting logic that may be used when implementing preferred embodiments of the present invention.

Referring now to FIG. 8, logic is depicted which may be used to implement a multi-stage process used by preferred embodiments to autonomically provision a grid service behavior by leveraging a grid hosting service as disclosed herein. This approach allows a grid hosting service to discharge its processing load in a covert fashion, offloading demand in a manner that is transparent to clients, according to the grid hosting service exemplified by the specification in FIG. 3.

As shown in Block 800, a grid hosting service as disclosed herein monitors its system load (referred to in FIG. 8 as its "inundation risk"). Block 810 compares the current system load to one or more configured capacity thresholds. (Note that while the examples used herein are primarily in terms of available capacity, this is by way of illustration and not of limitation. Additional and/or different metrics may be used by an implementation of the present invention. Other examples include response time metrics and/or service invocation rate, which may be measured in terms of the number of service invocations per unit of time.) If this comparison indicates that behavior is to be offloaded, then this grid hosting service is considered to be "inundated", and the test in Block 810 has a positive result. Processing then continues at Block 820; otherwise, the monitoring process continues, as shown by returning to Block 800. (Preferably, the monitoring process comprises taking samples at configured intervals or in response to a trigger such as receipt of an interrupt. The manner in which the monitoring is implemented may vary from one implementation to another without deviating from the scope of the present invention.)

As an example of the monitoring and comparison performed by Blocks 800 and 810, CPU usage at the grid hosting service might be monitored to determine when the processing demand is becoming too heavy. The CPU usage may therefore be compared to a configured CPU usage threshold, and if this threshold is exceeded, then the offloading process of Blocks 820–870 will be invoked.

Block 820 begins the offloading process by reviewing compatibility assertions, which in preferred embodiments have been stored upon receipt of compatibilityAssertion messages from peer grid hosting services. (Alternatively, the messages might be received after the reviewing process begins, or a combination of newly-received and previously-received messages might be reviewed.) This review process is used to determine candidates for the offloading process. Preferably, the platform available at each peer is considered in this process, along with the peer's advertised capacity metrics. (Refer to the compatibilityAssertions in FIGS. 4 and 6 for examples of how this information may be advertised among grid hosting services.)

If at least one candidate is identified in this process, then Block 830 checks to see if replication of a hosted service to that candidate is necessary. According to preferred embodiments, replication is necessary if a selected candidate does not have the required portType capabilities (which are preferably advertised using compatibilityAssertions of the form shown in the example of FIG. 5). When the test in Block 830 has a positive result, then Block 860 pushes a PTA compatibilityAssertion message (exemplified by the document fragment 700 in FIG. 7) to those candidate grid hosting services, suggesting that those candidates should self-provision the grid service implementation specified by the compatibilityAssertion. (As described above with reference to FIG. 7, the service implementation is specified using the "location" attribute of deployment element 730.) The inundated grid hosting service then monitors compatibilityAssertions received from the candidates (Block 870).

Once a candidate grid hosting service advertises compliance with the service to be replicated (by issuing a utility service compatibilityAssertion of the form shown in FIG. 5, in preferred embodiments), then the inundated service may optionally push service-specific data (such as state data of a service data element) to that advertising grid hosting service (Block 840). Whether the data is pushed to a particular advertising grid hosting service may depend on a number of factors, including whether it is desirable for the inundated grid hosting service to begin routing inbound requests to that peer. (For example, it might happen that a sufficient number of other candidates have already responded, and these other candidates will be used for offloading demand from the inundated grid hosting service. Or, the inundated grid hosting service may have begun to recover, and so forth.)

When replication is not necessary (i.e., when the identified candidate(s) already support(s) the service to be offloaded), then the test in Block 830 has a negative result and processing transfers from Block 830 to Block 840, where service-specific data may optionally be pushed to the candidate(s) as just discussed.

Once the service is available at one or more peer grid hosting services, the inundated grid hosting service can then route new inbound requests for that service to these peers, as shown in Block 850 (and as described above with reference to FIG. 3). The processing of FIG. 8 then ends for this iteration.

As has been demonstrated, the techniques disclosed herein provide for autonomically provisioning network-accessible services in a decentralized network having a federated grid infrastructure, whereby grid service behaviors of an inundated grid hosting service are dynamically offloaded to one or more peer grid hosting services. In this manner, the inundated grid hosting service is able to proactively respond to heavy processing demands (that is, processing demands that exceed certain thresholds), such as those that may be encountered during web storms. The likelihood of meeting the commitments in a utility service provider's service level agreements is therefore increased.

Note that the grid services concepts and syntax are undergoing revisions, and thus the operation names, parameter names, and so forth that are used herein to describe preferred embodiments might become deprecated during this revision process. Accordingly, the examples used herein are provided for purposes of illustration and not of limitation; alternative messages, operations, interfaces, formats, syntax, and so forth may be used without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of autonomically provisioning network-accessible service behaviors in a decentralized network having a federated grid infrastructure, comprising steps of:
    deploying a network-accessible service behavior as a grid service at a grid hosting service in the grid infrastructure;
    monitoring one or more thresholds applicable to the grid hosting service; and
    dynamically offloading demand for the grid service from the grid hosting service to a selected other grid hosting service in the grid infrastructure when at least one of the monitored thresholds is exceeded, further comprising steps of:
        determining, by the grid hosting service, at least one candidate grid hosting service, wherein each candidate grid hosting service is distinct from the grid hosting service and is executing a platform compatible with the grid service;
        for each of the determined candidate grid hosting services, determining, by the grid hosting service, whether that candidate grid hosting service is providing an implementation of the grid service, and if not, sending a message to that candidate to suggest that the candidate self-provision the grid service, wherein as a successful result of the self-provisioning of the grid service, the candidate then notifies the grid hosting service that the candidate is then providing the implementation of the grid service;
        selecting, by the grid hosting service, the other grid hosting service from among the determined at least one candidates that are providing the implementation of the grid hosting service; and
        routing, by the grid hosting service, at least one inbound request for the grid hosting service to the selected other grid hosting service.

2. The method according to claim 1, wherein the one or more thresholds are configurable.

3. The method according to claim 1, wherein at least one of the thresholds pertains to available capacity of the grid hosting service.

4. The method according to claim 1, wherein compatibility assertions received by the grid hosting service from each of the at least one candidate grid hosting services are used to determine, for each of the candidates, whether that candidate is executing the platform compatible with the grid service.

5. The method according to claim 1, wherein the message specifies a location from which the candidate can obtain the implementation of the grid service for which demand is to be offloaded.

6. The method according to claim 1, wherein the notification from the candidate that the candidate is then providing the implementation of the grid service comprises a compatibility assertion.

7. The method according to claim 1, wherein each of the determined candidates is also determined to have sufficient available processing capacity.

8. The method according to claim 1, wherein compatibility assertions received by the grid hosting service from each of the at least one candidate grid hosting services are used to determine, for each of the candidates, whether that candidate is providing the implementation of the grid service.

9. The method according to claim 8, wherein the compatibility assertions are sent by each of the at least one other candidates to advertise their capabilities.

10. A system for autonomically provisioning network-accessible service behaviors in a decentralized network having a federated grid infrastructure, comprising:
    means for deploying a particular network-accessible service behavior as a grid service at a grid hosting service in the grid infrastructure;
    means for monitoring one or more thresholds applicable to the grid hosting service; and
    means for dynamically offloading demand for the grid service from the grid hosting service to a selected other grid hosting service in the grid infrastructure when at least one of the monitored thresholds is exceeded, further comprising:
        means for determining, by the grid hosting service, at least one candidate grid hosting service, wherein each candidate grid hosting service is distinct from the grid hosting service and is executing a platform compatible with the grid service;
        for each of the determined candidate grid hosting services, means for determining, by the grid hosting service, whether that candidate grid hosting service is providing an implementation of the grid service, and if not, for sending a message to that candidate to suggest that the candidate self-provision the grid service, wherein as a successful result of the self-provisioning of the grid service, the candidate then notifies the grid hosting service that the candidate is then providing the implementation of the grid service;

means for selecting, by the grid hosting service, the other grid hosting service from among the determined at least one candidates that are providing the implementation of the grid hosting service; and means for routing, by the grid hosting service, at least one inbound request for the grid hosting service to the selected other grid hosting service.

11. The system according to claim 10, wherein compatibility assertions received by the grid hosting service from each of the at least one candidate grid hosting services are used to determine, for each of the candidates, whether that candidate is providing the implementation of the grid service.

12. A computer program product for autonomically provisioning network-accessible service behaviors in a decentralized network having a federated grid infrastructure, the computer program product embodied on one or more computer-readable media and comprising:

computer-readable program code for deploying a particular network-accessible service behavior as a grid service at a grid hosting service in the grid infrastructure;

computer-readable program code for monitoring one or more thresholds applicable to the grid hosting service; and computer-readable program code for dynamically offloading demand for the grid service from the grid hosting service to a selected other grid hosting service in the grid infrastructure when at least one of the monitored thresholds is exceeded, further comprising:

computer-readable program code for determining, by the grid hosting service, at least one candidate grid hosting service, wherein each candidate grid hosting service is distinct from the grid hosting service and is executing a platform compatible with the grid service;

for each of the determined candidate grid hosting services, computer-readable program code for determining, by the grid hosting service, whether that candidate grid hosting service is providing an implementation of the grid service, and if not, for sending a message to that candidate to suggest that the candidate self-provision the grid service, wherein as a successful result of the self-provisioning of the grid service, the candidate then notifies the grid hosting service that the candidate is then providing the implementation of the grid service;

computer-readable program code for selecting, by the grid hosting service, the other grid hosting service from among the determined at least one candidates that are providing the implementation of the grid hosting service; and computer-readable program code for routing, by the grid hosting service, at least one inbound request for the grid hosting service to the selected other grid hosting service.

13. The computer program product according to claim 12, wherein compatibility assertions received by the grid hosting service from each of the at least one candidate grid hosting services are used to determine, for each of the candidates, whether that candidate is providing the implementation of the grid service.

* * * * *